May 11, 1954
R. METAILLER
2,678,136
TURNTABLES FOR CRANES AND EXCAVATORS
Filed Jan. 3, 1951
2 Sheets-Sheet 1
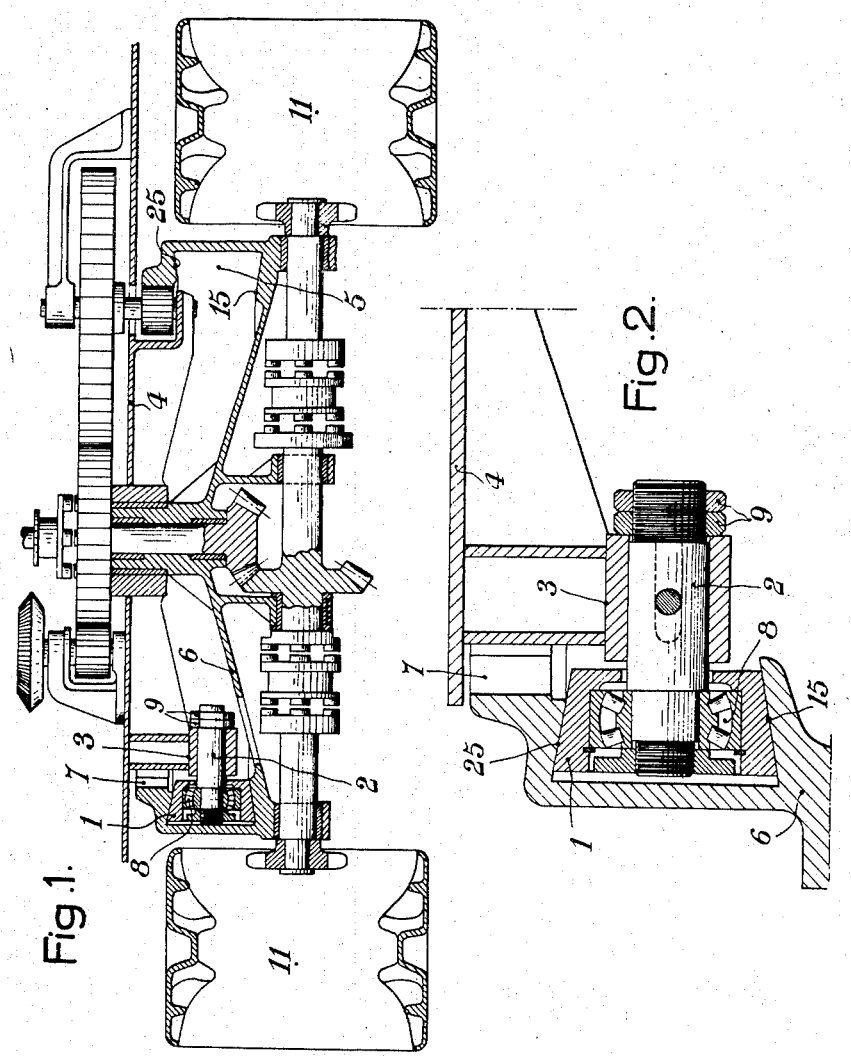
INVENTOR
ROGER METAILLER
By:
Haseltine, Lake & Co.
AGENTS May 11, 1954  R. METAILLER  2,678,136
TURNTABLES FOR CRANES AND EXCAVATORS
Filed Jan. 3, 1951  2 Sheets-Sheet 2
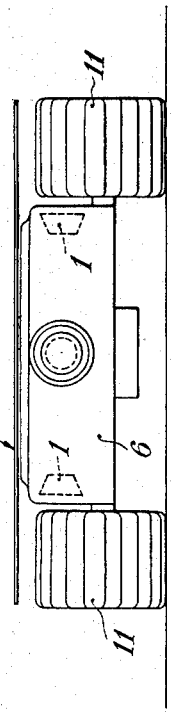
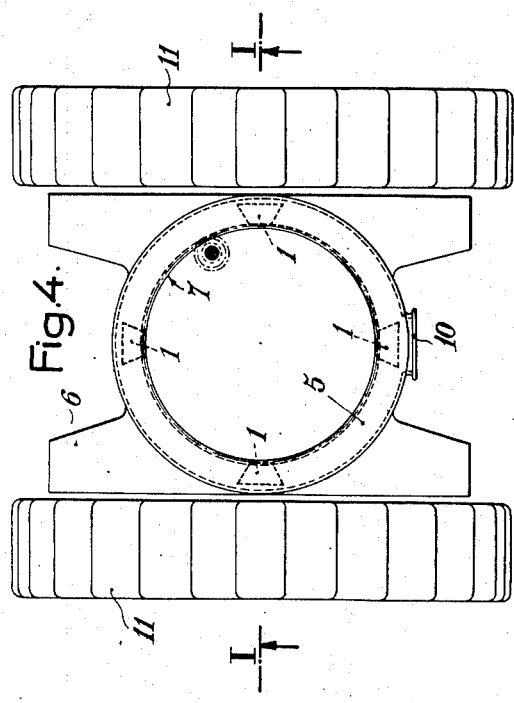
INVENTOR
ROGER METAILLER
By:
Haseltine, Lake & Co.
AGENTS Patented May 11, 1954

2,678,136

UNITED STATES PATENT OFFICE 2,678,136

TURNTABLE FOR CRANES AND EXCAVATORS

Roger Métailler, Paris, France, assignor to Societe Anonyme so-called: Societe d'Etudes et de Recherches Industrielles "S. O. T. R. E. M. A.," Casablanca, Morocco Application January 3, 1951, Serial No. 204,180

Claims priority, application France October 31, 1950

2 Claims. (Cl. 212—69)

Crawler- or wheel- mounted power shovels, cranes and other machines of this type consist essentially of a fully rotatable upper turntable mounted on a supporting undercarriage.

As a rule, the turntable is centred by means of a centre-pintle or pivot fast with the undercarriage, and supported by a circular roller track also fast with the undercarriage.

To guard the turntable and the cab usually carried thereby from overturning and keep the roller track clearance to a minimum in order to ease the bending stress on the pivot, the latter is provided with an adjusting bolt.

Some known arrangements for fastening the turntable to the supporting undercarriage use rollers mounted on brackets fixed beneath the rotary platform and moving externally of the roller track, i. e. opposite to the rotational axis of the turntable.

This invention provides a novel arrangement of the cone rollers and their supporting members fast with the turntable.

According to this invention, the roller mounting for slewing turntable or platform of a crane of a power shovel or of similar machines comprises cone rollers rotatably mounted on supporting members fixed to the turntable and a pair of superposed annular roller tracks fast with the undercarriage and adapted to receive the cone rollers therebetween, the roller-carrying supporting members being positioned internally of these roller tracks, i. e. on the side thereof which is nearer to the axis of rotation of the platform.

The drawings attached to this specification and forming part thereof illustrate diagrammatically by way of example a practical embodiment of the turntable mounting according to the invention. In the drawings:

Fig. 1 is a cross-sectional view of the undercarriage and turntable assembly as seen along the line I—I of Fig. 4.

Fig. 2 is a longitudinal section of a cone roller journaled on its shaft and fitted in the two-track roller channel.

Fig. 3 is a diagrammatical front view of the undercarriage-turntable assembly.

Fig. 4 is a diagrammatical plane view of this assembly.

The cone rollers 1 are mounted endwise of shafts 2 carried by brackets 3 fixed in turn to the platform 4. The rollers 1 roll in a two-track roller channel 5 formed in the undercarriage chasis 6; this two-track roller channel 5 comprises a lower track 15 and an upper track 25 and is positioned beneath the slewing rack 7 whilst the brackets 3 are disposed internally of the annular structure formed by the roller track 5.

The detail view of Fig. 2 illustrates more clearly how the roller mounting is carried out. Rollers 1 are journaled through the medium of self-aligning bearings 8 on shafts 2 passing through bracket members 3. Shafts 2 are provided with nuts 9 for adjusting the rollers and taking up excessive play in the roller track.

The cone rollers 1 are introduced into the track channel 5 through an aperture 10 formed in one side of the chassis and fitted with a cover plate, as clearly shown in Fig. 4.

The advantages resulting from the general arrangement described hereinabove and illustrated in the drawings may be summarized as follows:

(1) Given a same distance between crawlers or wheels, the chassis may be fitted with a roller track having a greater diameter than in hitherto known arrangements;

(2) All other conditions remaining unchanged, the turntable 4 is positioned at the lowermost level above the chassis 6, thereby lowering to the maximum the centre of gravity of the machine;

(3) Owing to the insertion of rollers 1 in the two-track roller channel 5 the retaining or check member usually fitted for the purpose of anchoring the turntable to the centre pintle may be dispensed with;

(4) The roller track channel may be closed externally whereby protecting it and the rollers therein from the detrimental action of grit or gravel carried along by the crawlers or wheels.

Thus, the above-described arrangement serves jointly as a means for bearing, centring and anchoring the turntable to the undercarriage chassis.

What I claim is:

1. In a machine of the hoisting type comprising a stationary frame structure and a turntable mounted for slewing motion on said frame structure, an arrangement for connecting said frame structure and said turntable through a single circular set of rollers, said arrangement comprising a first circular roller track fast with said frame structure, said track having its upper, roller-engaging face of frusto-conical shape inclined outwardly, another circular roller track fast with said frame structure and overlying said first circular roller track, said other circular roller track having its lower, roller-engaging face of frusto-conical shape inclined inwardly with the same degree of inclination as said upper face of said first track, supporting brackets rigid with and disposed ringwise beneath said turntable concentrically to and inside said tracks, a bearing in each of said supporting brackets, the axis of each bearing extending in a radial direction, a stub shaft held against rotation but mounted for axial sliding motion in each of said supporting brackets, one end of said stub shaft extending inbetween said first and second circular roller tracks, the opposite end of said stub shaft projecting inwardly from the relevant supporting bracket and being screw-threaded, a taper roller rotatably mounted on the first-mentioned end of said stub shaft, a nut and a locking nut screwed on said other end of said stub shaft so as to engage the corresponding face of said supporting bracket and cause said roller to engage both said tracks.

2. In a machine of the hoisting type comprising a stationary frame structure and a turntable mounted for slewing motion on said frame structure, an arrangement for connecting said frame structure and said turntable through a single circular set of rollers, said arrangement comprising a first circular roller track fast with said frame structure, said track having its upper, roller-engaging face of frusto-conical shape inclined outwardly, another circular roller track fast with said frame structure and overlying said first circular roller track, said other circular roller track having its lower, roller-engaging face of frusto-conical shape inclined inwardly with the same degree of inclination as said upper face of said first track, supporting brackets rigid with and disposed ringwise beneath said turntable concentrically to and inside said track, a bearing in each of said supporting brackets, the axis of each bearing extending in a radial direction, a stub shaft held against rotation but mounted for axial sliding motion in each of said supporting brackets, one end of said stub shaft extending inbetween said first and second circular roller tracks, the opposite end of said stub shaft projecting inwardly from the relevant supporting bracket and being screw-threaded, a self-aligning roller bearing mounted on said one end of said stub shaft, a taper roller mounted on said self-aligning roller bearing, a nut and a locking nut screwed on said other end of said stub shaft so as to engage the corresponding face of said supporting bracket and cause said roller to engage both said tracks.

References Cited in the file of this patent

UNITED STATES PATENTS

| Number | Name | Date |
|---|---|---|
| 294,395 | Lyman | Mar 4, 1884 |
| 1,289,427 | Ferris | Dec. 31, 1918 |
| 2,071,135 | McGiffert et al. | Feb. 16, 1937 |
| 2,177,333 | Reed | Oct. 24, 1939 |
| 2,366,558 | Rauch | Jan. 2, 1945 |
| 2,408,378 | Davenport et al. | Oct. 1, 1946 |
| 2,513,726 | Huston | July 4, 1950 |

FOREIGN PATENTS

| Number | Country | Date |
|---|---|---|
| 621,510 | Germany | Nov. 8, 1935 |